United States Patent Office 3,634,335
Patented Jan. 11, 1972

3,634,335
CHROMIUM AND MOLYBDENUM TETRAPHOSPHIDES HAVING ISOTYPIC, MONOCLINIC CRYSTAL STRUCTURES
Paul Christopher Donohue, Wilmington, Del., assignor to E. I. du Pont de Nemours and Company, Wilmington, Del.
No Drawing. Filed July 16, 1970, Ser. No. 55,597
Int. Cl. H01b 1/06; C01b 25/08
U.S. Cl. 252—518
10 Claims

ABSTRACT OF THE DISCLOSURE

Disclosed herein are isotypic, monoclinic tetraphosphides of chromium and molybdenum represented by the formula, $Cr_{1-x}Mo_xP_4$, wherein $x$ is from 0 to 1; a process for making the tetraphosphides by reacting the metals or their known phosphides with phosphorus at elevated temperatures and pressures; and use thereof as electrical conductors.

BACKGROUND OF THE INVENTION (1) Field of the invention

This invention relates to novel chromium and/or molybdenum tetraphosphides, $(Cr, Mo)P_4$, the process for making them and their use as electrical conductors.

(2) Description of the prior art

Heretofore, no phosphides of chromium and/or molybdenum containing more than three atoms of phosphorus per atom of metal have been known.

SUMMARY OF THE INVENTION

The novel compositions of matter are represented by the formula, $Cr_{1-x}Mo_xP_4$, wherein x is from 0 to 1. The products are electrically conducting and crystallographically isotypic and have monoclinic unit cells with space group $C_2/c$. which space group is characteristic of the arrangement of the atoms within a particular monoclinic crystal lattice system.

The novel tetraphosphides contain four atoms of phosphorus per metal atom and are homogeneous compositions of single crystalline phase and are not simply mixtures. The formula shows complete solid solution of one binary phase in the other, i.e., $x$ moles of $MoP_4$ dissolved homogeneously in $(1-x)$ moles of $CrP_4$, in the case where $x$ is more than zero but less than one.

The formula of the products of this invention may be written as $(Cr, Mo)P_4$, in which the symbol $(Cr, Mo)$ denotes the full range from pure Cr to pure Mo. Representation of crystalline phases of variable composition in this way is conventional, "Nomenclature of Inorganic Chemistry," J. Am. Chem. Soc. 82, 5532, Section 4.4 (1960).

As is the case with many inorganic compounds, the compositions of this invention may differ somewhat from exact stoichiometry, e.g., the atomic ratios of phosphorus to chromium, of phosphorus to molybdenum, and of phosphorus to a combination of chromium and molybdenum may vary from about 3.99 to 4.01. Nonstoichiometric compounds are well known—see, for example, Wadsley's chapter in Mandelcorn, "Nonstoichiometric Compounds," Academic Press, New York, 1964, pp. 98–209.

In the tetraphosphide monoclinic crystal structures of this invention, the cell dimensions, $a$, $b$ and $c$, and the angle between the $a$ and $c$ planes, $\beta$, are:

|   | Chromium tetraphosphide | Molybdenum tetraphosphide | $(Cr, Mo)P_4$ |
|---|---|---|---|
| a, A | 5.1914±0.005 | 5.3134±0.005 | 5.1914 to 5.3134±0.005. |
| b, A | 10.7600±0.007 | 11.1385±0.009 | 10.7600 to 11.1385±0.009. |
| c, A | 5.7712±0.005 | 5.8204±0.005 | 5.7712 to 5.8204±0.005. |
| $\beta$ | 110.65±0.1° | 110.64±0.1° | 110.64 to 110.65±0.1. |

The tetraphosphides are prepared by heating mixtures of elementary chromium and/or elementary molybdenum with about 2 to 4.5, preferably about 4, atomic equivalents of elementary phosphorus for at least one minute, preferably for 60 minutes or more, at temperatures of 700–1400° C., preferably 1000–1200° C., and at pressures of about 3–65 kilobars (kb.), preferably 15–30 kb. One kilobar (kb.) is equivalent to about 1000 (i.e. 986.92) atmospheres.

An alternative procedure comprises heating for the same length of time and at the same temperature and pressure a mixture of at least one of $Cr_3P$, $Cr_2P$, $CrP$, $CrP_2$, $Mo_4P_3$, $Mo_3P$, and $MoP$ with, preferably, the approximate quantity of elementary phosphorus theoretically required to achieve tetraphosphide stoichiometry.

Chromium and molybdenum tetraphosphides and their solid solutions are black, crystalline solids stable in air at temperatures up to about 450° C. At temperatures of about 500° C. or above, the tetraphosphides decompose in vacuo or at atmospheric pressure in gases such as argon or nitrogen, liberating elementary phosphorus which may be condensed and recovered. Thus the products are useful in preparing pure phosphorus. The tetraphosphides are stable in water and in hydrochloric acid but react with nitric acid.

DESCRIPTION OF THE PREFERRED EMBODIMENTS

Red phosphorus, which is convenient to handle and relatively cheap, is usually employed as a reactant though any of its polymorphic forms may be used.

It is preferred to use powdered chromium and molybdenum as reactants since this facilitates mixing and results in more uniform reaction products. Reactants are preferably thoroughly ground together before reaction, e.g., by mortar and pestle or its equivalent. If desired, reaction products may be reground and subjected to a second reaction cycle.

Elemental chromium, molybdenum, and phosphorus, and phosphides of chromium and molybdenum used as reactants are ordinarily of the highest available purity in order that the products may be of maximum purity. Compositions of $(Cr, Mo)P_4$ are obtained, though of lower purity, from reactants that are not of the highest purity. Preference for use of pure reactants is dictated by difficulty in purifying reaction products rather than by necessity. Considerable purification may be effected by manual separation of phases.

Formation of by-products is minimized by employing the reactants in a ratio of approximately 1 gram atom of Cr and/or Mo to 4 gram atoms of P. This ratio can, however, be varied considerably, e.g., at least over the range of 1 gram atom of Cr and/or Mo to from 2 to 4.5 gram atoms of P. When the atomic ratio of phosphorus to metal is as low as 2:1, lower phosphides such as CrP or $MoP_2$ form along with the $(Cr, Mo)P_4$. When the ratio of phosphorus to metal is 4.5:1 or higher, the black polymorph of phosphorus usually appears in the product. The several by-products may usually, however, be separated from (Cr, Mo)$P_4$ manually.

Reaction temperature and pressure are important. At atmospheric pressure, mixtures of white phosphorus and phosphides containing less than four atoms of phosphorus per atom of metal are formed. Pressures of about 3–65 kb., preferably 15–30 kb., are required for formation of (Cr, Mo)$_4$. Minimum pressures should be kept at about 3 kb. because below that only very small amounts, if any, of the novel compositions are produced. Operable temperature ranges are from about 700° to 1400° C. with 1000° to 1200° C. being preferred.

The time of reaction is not critical. When pressure is within the prescribed limits, tetraphosphide formation commences as soon as reaction temperature is reached. Reaction times of 1 to 2 hours are convenient and adequate. Crystal growth may be promoted by allowing reaction products to cool slowly from reaction temperature to 800°–1000° C. before quenching to room temperature. Sometimes crystal growth may be promoted simply by extending the length of time at reaction temperature.

Chromium tetraphosphide is relatively easy to obtain in sizable single crystals. For example, the procedure of Example 2 affords single crystals of adequate size for the measurement of electrical resistivity by a standard four-probe technique. Molybdenum tetraphosphide and the chromium-molybdenum tetraphosphides are more difficult to obtain as large single crystals and are prone to form as microcrystals.

Reaction may be effected at pressures in the vicinity of 3 kb. in sealed, evacuated, heavy-walled glass tubes heated electrically within metal pressure vessels. The glass must be high melting and is preferably that sold under the trademark, Pyrex ®. Both tubes and vessel are usually horizontally disposed. Pressure is generated by application of argon or other gas to the pressure vessel. Pressures up to about 0.2 kb. may be applied to cold Pyrex ® tubes without crushing them. At about 700° C. the tubes soften and subsequently transmit applied pressure to the reaction mixtures. Because the tubes begin to soften at about 700° C., it is desirable to partially surround them with open retaining tubes of, for example, platinum. Reaction temperature and pressure are usually maintained for about three hours and, in fact, maximum reaction pressure is preferably maintained until temperature has dropped to 700° C. or below. Pressure reactors may be equipped for rapid cooling if this is desired.

Reactions at about 15–65 kb. pressure are conveniently carried out in a tetrahedral anvil of the sort described by E. C. Lloyd et al., J. Res. Nat. Bur. Stand. 63C, 59 (1959). The pulverized and intimately mixed reactants are compressed into pellets at about 40 tons/sq. in. pressure employing a conventional pellet press. The pellets are then placed in a boron nitride container which fits into a graphite sleeve that serves as a resistance heater. This assembly is enclosed in a pyrophyllite tetrahedron and placed in the anvil device, which is capable of generating pressures in excess of 65 kb.

The manner of calibrating the tetrahedral anvil is important since conventional gauges cannot be used at the extremely high pressures which are developed.

Four of the calibration points, taken at room temperature, used to determine pressure developed in this device, appear in the 1963 edition of the American Institute of Physics Handbook, pp. 4–43, and are as follows:

Bismuth I→II 25.37±0.02 kb.
Bismuth II→III 26.96±0.18 kb.
Thallium II→III 36.69±0.11 kb.
Barium II→III 59.0±1.0 kb.

The cold assembly is compressed, and the charges are then heated to the desired temperature, which is measured by an appropriate thermocouple. The reported temperatures have not been corrected for the effect of pressure on thermocouple behavior, i.e., standard E.M.F. tables for one atmosphere have been used. Temperatures were measured at the central surface of the boron nitride crucibles. Temperatures at the ends of the crucibles were probably several hundred degrees cooler.

Chromium and/or molybdenum tetraphosphides are usually obtained as single phases or as discrete segments of the product visually distinct from by-products. This segregation, which probably results from the temperature gradient within the reaction mass, permits manual separation of the various phases. Clean separation is not always possible; hence, more reliance is placed on density and X-ray diffraction data than on analytical data in characterizing products.

The products of all examples were examined by Debye-Scherrer X-ray powder diffraction technique for purposes of identification. Space group was determined by Buerger precession camera technique. Both the Debye-Scherrer and Buerger techniques are well known in the art. The composition of chromium tetraphosphide was established by X-ray measurements, chemical analysis, and density measurement, and the compositions of molybdenum tetraphosphide and of the chromium-molybdenum tetraphosphides were established by analogies in X-ray diffraction patterns, density, and the application of Vegard's law which states that "in solid solutions the cell dimensions vary linearly with the concentration of solute" Kirk and Othmer, Encyclopedia of Chemical Technology, vol. IV (1949), p. 645.

The electrical resistivities of $CrP_4$, prepared by the method of Example 2, and $MoP_4$, prepared by the method of Example 7, measured by a conventional four-probe technique, showed that both products have high metal-like conductivity:

|  | Resistivity in ohm-cm. | |
| --- | --- | --- |
|  | 4.2° K. | 298° K. |
| $CrP_4$ | $2-6 \times 10^{-5}$ | $2-3 \times 10^{-4}$ |
| $MoP_4$ | $1-2 \times 10^{-3}$ | $2-0 \times 10^{-3}$ |

It was discovered further that chromium tetraphosphide undergoes a reversible phase change at 560° K. accompanied by a reversible increase in resistivity of 300 microohm-cm.

The lower resistivity of $CrP_4$ as contrasted to that reported for $MoP_4$ may be due to the fact that the resistivity of $MoP_4$ was measured on a block sample of polycrystalline material rather than on a single crystal. Resistivities are expected to be somewhat higher when measured on polycrystalline aggregates rather than single crystals. In any event, the products herein are excellent electrical conductors. In fact, molybdenum tetraphosphide which has a low temperature coefficient of resistivity is eminently well suited for use as an electrically conducting printed circuit on dielectric ceramic bases used over a wide temperature range.

EXAMPLE 1

Preparation of $CrP_4$

A mixture of 0.520 g. of Cr and 0.650 g. of P in the atomic ratio 1:2.1 was ground together and pressed into a pellet. The pellet was placed in a tetrahedral anvil apparatus as described above, pressured to 30 kb., and reacted at 1200° C. for 1 hour, then cooled over a period of 1 hour to 1000° C., and quenched. The reaction product contained $CrP_4$ crystals whose X-ray diffraction powder pattern is given in Table I. The cell constants and space group were: $a=5.1914\pm0.0004$ A., $b=10.7600\pm0.0007$ A., $c=5.7712\pm0.0005$ A., $\beta=110.648\pm0.005°$, space group $C_2/C$. The density was: found, 3.88 g./cm.³; calculated for $4CrP_4$ per cell, 3.87 g./cm.³. The reaction product also contained CrP crystals.

*Analysis.*—Calcd. for $CrP_4$ (percent): Cr, 29.56; P, 70.44. Found (percent): Cr, 28.6; P, 65.8.

TABLE I.—POWDER PATTERN OF $CrP_4$

| I [1] | h | k | l | d (obs.) [2] | d (calc.) [2] |
|---|---|---|---|---|---|
| 50 | −1 | 1 | 0 | 4.4249 | 4.4275 |
| 10 | 1 | 1 | 1 | 2.9843 | 2.9856 |
| 15 | −1 | 3 | 0 | 2.8842 | 2.8854 |
| 100 | −1 | 3 | 1 | 2.8002 | 2.8004 |
| 80 | 0 | 0 | 2 | 2.6999 | 2.7002 |
| 35 | −2 | 0 | 0 | 2.4285 | 2.4289 |
| 15 | 0 | 4 | 1 | 2.4077 | 2.4078 |
| 45 | −2 | 2 | 1 | 2.3274 | 2.3276 |
| 60 | −2 | 2 | 0 | 2.2147 | 2.2138 |
| 25 | −2 | 2 | 2 | 2.0687 | 2.0687 |
| 45 | 1 | 1 | 2 | 2.0329 | 2.0331 |
| 20 | −1 | 5 | 1 | 1.9405 | 1.9399 |
| 65 | −2 | 4 | 1 | 1.8627 | 1.8627 |
| 30 | 2 | 2 | 1 | 1.8502 | 1.8502 |
| 30 | 0 | 6 | 0 | 1.7933 | 1.7933 |
| 10 | 1 | 5 | 1 | 1.7692 | 1.7692 |
| 15 | −3 | 1 | 1 | 1.7061 | 1.7058 |
| 40 | 0 | 6 | 1 | 1.7021 | 1.7019 |
| 70 | −1 | 3 | 3 | 1.6951 | 1.6950 |
| 40 | −3 | 1 | 2 | 1.6533 | 1.6532 |
| 20 | −3 | 1 | 0 | 1.6014 | 1.6012 |
| 55 | 2 | 4 | 1 | 1.5897 | 1.5896 |
| 5 | −3 | 3 | 1 | 1.5571 | 1.5565 |
| 10 | 2 | 0 | 2 | 1.5536 | 1.5538 |
| 5 | 1 | 1 | 3 | 1.5069 | 1.5071 |
| 35 | 0 | 6 | 2 | 1.4936 | 1.4938 |
| 10 | −2 | 4 | 3 | 1.4829 | 1.4825 |
| 10 | −3 | 1 | 3 | 1.4799 | 1.4798 |
| 5 | −1 | 7 | 0 | 1.4657 | 1.4655 |
| 10 | −2 | 6 | 0 | 1.4428 | 1.4427 |
| 40 | −2 | 0 | 4 | 1.4098 | 1.4099 |
| 15 | 1 | 3 | 3 | 1.0415 | 1.4011 |
| 20 | −3 | 3 | 3 | 1.3788 | 1.3791 |
| 10 | −1 | 7 | 2 | 1.3495 | 1.3496 |
| 15 | −3 | 5 | 1 | 1.3471 | 1.3472 |
| 5 | 0 | 8 | 0 | 1.3443 | 1.3450 |
| 10 | −1 | 3 | 4 | 1.3348 | 1.3349 |
| 10 | 3 | 3 | 1 | 1.3198 | 1.3198 |
| 10 | −4 | 0 | 2 | 1.2907 | 1.2909 |

[1] Relative intensity of specified X-ray diffraction line.
[2] Interplanar spacing in angstroms.

EXAMPLE 2

Preparation of $CrP_4$

A mixture of Cr and P in the atomic ratio 1:2.1 was ground together, pressed into a pellet, and placed in the boron nitride container of a tetrahedral anvil apparatus. The pellet was cold pressed to 45 kb., heated to and held at 1200° C. for 1 hour, cooled over a period of 2 hours to 1000° C., and quenched. The reaction product contained large black crystals of $CrP_4$ and some CrP microcrystals.

*Analysis.*—Calcd. for $CrP_4$ (percent): Cr, 29.56; P, 70.44. Found (percent): Cr, 30.7; P, 72.7.

Resistivity measurements made on a single crystal showed metallic behavior, i.e., a resistivity of $2.6 \times 10^{-6}$ ohm-cm. at 4.2° K. and a resistivity of $2.3 \times 10^{-4}$ ohm-cm. at 298° K. At 550° K. the resistivity increased reversibly by 300 micro-ohm-cm.

EXAMPLE 3

Preparation of $CrP_4$

A mixture of Cr and P in atomic weight ratio of 1:4 was pressed into a pellet, cold pressured to 30 kb., heated to 1100° C., held 2 hours at 1100° C., and quenched. The reaction product contained black microcrystalline $CrP_4$ which showed a reversible endotherm, i.e., phase change, in nitrogen at 296° C. by differential thermal analysis. The reaction product also contained some black phosphorus.

EXAMPLE 4

Preparation of $CrP_4$

A mixture of Cr and P in atomic weight ratio of 1:4 was pressed into a pellet, cold pressured to 15 kb., heated to 1000° C., held there for 2 hours, and quenched. The resulting pellet contained black microcrystals of $CrP_4$ in the center. The pellet also contained some black phosphorus.

EXAMPLE 5

Preparation of $CrP_4$

A mixture of Cr and P in atomic weight ratio of 1:4 was pressed into a pellet, cold pressured to 65 kb., heated to 1000° C., held there for 2 hours, cooled over a period of 2 hours to 800° C., and quenched. The product was substantially all $CrP_4$ as determined from its X-ray diffraction pattern.

EXAMPLE 6

Preparation of $CrP_4$

A mixture of Cr and P in atomic weight ratio of 1:4 was sealed in vacuo in a Pyrex® glass tube (10 mm. O.D. x 6 mm. I.D. x ca. 4 inches long). The tube was placed in a platinum jacket and reaction was effected in an internally heated pressure vessel. Two hundred atmospheres argon pressure was applied at room temperature. Temperature was raised to 700° C. and pressure was then increased to 3000 atm. Temperature was then increased to 1000° C., held there for 3 hours, lowered over 3 hours to 700° C., and dropped rapidly to room temperature, maintaining the pressure at 3000 atm. The dark red-brown product consisted partly of $CrP_4$.

EXAMPLE 7

Preparation of $MoP_4$

A mixture of 0.9594 g. of Mo and 1.240 g. of P, i.e., in atomic weight ratio of 1:4, was pressed into a pellet, cold pressured to 30 kb., held for 1 hour at 1000° C., cooled over a period of 2 hours to 800° C., and quenched. $MoP_4$ was obtained along with some $MoP_2$ and an unidentified material. The cell dimensions of $MoP_4$ indicated a monoclinic structure similar to that of $CrP_4$ (see Table II for X-ray diffraction data). Cell dimensions were: $a=5.3134\pm0.0001$ A., $b=11.1385\pm0.0009$ A., $c=5.8204\pm0.0002$ A., $\beta=110.64\pm0.01°$. Electrical resistivity measurements made on a compressed piece of $MoP_4$ showed it to be a good conductor with little variation with temperature. The resistivity was $2\times10^{-3}$ ohm-cm. at 298° K. and $1.2\times10^{-3}$ ohm-cm. at 4.2° K.

EXAMPLE 8

Preparation of $MoP_4$

A mixture of 0.9594 g. of Mo and 1.269 g. of P, atomic weight ratio of 1:4.09, was pressed into a pellet, cold pressured to 15 kb., held for 2 hours at 1100° C., cooled over a period of 2 hours to 800° C., and quenched. The product was shown by X-ray diffraction to be black microcrystalline $MoP_4$.

TABLE II.—POWDER PATTERN OF MoP₄

| I[1] | h | k | l | d (obs.)[2] | d (calc.)[2] |
|---|---|---|---|---|---|
| 20 | 0 | 2 | 0 | 5.57511 | 5.57289 |
| 90 | −1 | 1 | 0 | 4.54284 | 4.54021 |
| 10 | −1 | 1 | 1 | 4.22231 | 4.22018 |
| 15 | 0 | 2 | 1 | 3.89776 | 3.89577 |
| 15 | 1 | 1 | 1 | 3.03815 | 3.03931 |
| 20 | −1 | 3 | 0 | 2.97536 | 2.97601 |
| 100 | −1 | 3 | 1 | 2.88039 | 2.88021 |
| 5 | −1 | 1 | 2 | 2.76134 | 2.76115 |
| 85 | 0 | 0 | 2 | 2.72456 | 2.72407 |
| 2 | −2 | 0 | 0 | 2.48859 | 2.48568 |
| 5 | 0 | 2 | 2 | 2.44734 | 2.44734 |
| 15 | 1 | 3 | 1 | 2.40688 | 2.40665 |
| 35 | −2 | 2 | 1 | 2.38779 | 2.38616 |
| 55 | −2 | 2 | 0 | 2.26727 | 2.27011 |
| 25 | −2 | 2 | 2 | 2.10973 | 2.11009 |
| 45 | 1 | 1 | 2 | 2.06126 | 2.06118 |
| 2 | −1 | 5 | 0 | 2.03249 | 2.03403 |
| 15 | −1 | 5 | 1 | 2.00311 | 2.00264 |
| 45 | −2 | 4 | 1 | 1.91664 | 1.91661 |
| 15 | 2 | 2 | 1 | 1.88084 | 1.89035 |
| 20 | 0 | 6 | 0 | 1.85779 | 1.85763 |
| 15 | 1 | 5 | 1 | 1.82135 | 1.82135 |
| 35 | 0 | 6 | 1 | 1.75848 | 1.75824 |
| 50 | −1 | 3 | 3 | 1.72057 | 1.72015 |
| 30 | −3 | 1 | 2 | 1.68818 | 1.68874 |
| 20 | −3 | 1 | 0 | 1.63960 | 1.63910 |
| 40 | 2 | 4 | 1 | 1.63146 | 1.62986 |
| 15 | 0 | 6 | 2 | 1.53357 | 1.53474 |
| 20 | −2 | 6 | 1 | 1.51912 | 1.51931 |
| 5 | −1 | 5 | 3 | 1.46345 | 1.46371 |
| 2 | 3 | 1 | 1 | 1.43655 | 1.43731 |
| 5 | −2 | 0 | 4 | 1.42426 | 1.42499 |
| 2 | 0 | 8 | 0 | 1.39637 | 1.39322 |
| 5 | −3 | 5 | 1 | 1.38418 | 1.38551 |
| 2 | 0 | 0 | 4 | 1.36202 | 1.36204 |
| 5 | −1 | 3 | 4 | 1.35105 | 1.35118 |
| 5 | −4 | 0 | 2 | 1.32151 | 1.32022 |
| 5 | 0 | 6 | 3 | 1.29951 | 1.29859 |
| 15 | −2 | 6 | 3 | 1.29278 | 1.29258 |
| 15 | 1 | 7 | 2 | 1.26776 | 1.26820 |
| 5 | −3 | 5 | 3 | 1.25549 | 1.25577 |
| 10 | −4 | 0 | 0 | 1.24182 | 1.24284 |
| 5 | 3 | 5 | 1 | 1.21497 | 1.21514 |
| 15 | 1 | 1 | 4 | 1.20224 | 1.20232 |
| 5 | −2 | 8 | 2 | 1.18846 | 1.18881 |
| 2 | 3 | 3 | 2 | 1.17469 | 1.17227 |

[1] Relative intensity of specified X-ray diffraction line.
[2] Interplanar spacing in angstroms.

EXAMPLE 9

Preparation of $Cr_{0.5}Mo_{0.5}P_4$

A mixture of 0.130 g. of Cr, 0.2398 g. of Mo and 0.650 g. of P, 1:1:8.4 atomic weight ratio, was pressed into a pellet, pressured to 30 kb., heated to 1000° C., held 1 hour at this temperature, cooled to 800° C. over a 2-hour period, and quenched. The black microcrystalline product had a monoclinic crystal structure with an X-ray diffraction pattern that was similar to that of $CrP_4$ and $MoP_4$. Cell dimensions were computed and found to be intermediate between those of $CrP_4$ and $MoP_4$. The formula was established as $Cr_{0.5}Mo_{0.5}P_4$ by Vegard's law. Cell volume was 313.3 cubic angstroms. Cell volume calculated for $Cr_{0.5}Mo_{0.5}P_4$, assuming Vegard's law, was 312.95 cubic angstroms.

The products of this invention are electrically conducting and useful as components of electric circuits. Their utility was demonstrated in the following manner. Crystalline samples of $MoP_4$, $CrP_4$, and $Cr_{0.5}Mo_{0.5}P_4$, prepared as described in Examples 8, 3, and 9, respectively, were separately placed in series in an electrical circuit comprising a battery and an incandescent lamp. When one of the tetraphosphides was an integral part of the circuit, the tetraphosphide conducted the electric current, and the incandescent lamp became luminous. Removal of the tetraphosphide broke the circuit, and the light went out.

The embodiments of the invention in which an exclusive property or privilege is claimed are defined as follows:

1. A tetraphosphide composition of the formula $Cr_{1-x}Mo_xP_4$, wherein $x$ is from 0 to 1.

2. A tetraphosphide according to claim 1, having a monoclinic crystal structure wherein the unit cell dimensions, $a$, $b$ and $c$, and the angle, $\beta$, between the $a$ and $c$ planes, are:

$a$: 5.1914 to 5.3134±0.005 A.
$b$: 10.7600 to 11.1385±0.009 A.
$c$: 5.7712 to 5.8204±0.005 A.
$\beta$: 110.64 to 110.65±0.1 A.

3. A tetraphosphide according to claim 1, wherein $x$ is 0, the composition being $CrP_4$.

4. A tetraphosphide according to claim 1, wherein $x$ is 1, the composition being $MoP_4$.

5. A tetraphosphide according to claim 1, wherein $x$ is 0.5, the composition being $Cr_{0.5}Mo_{0.5}P_4$.

6. A homogeneous, solid solution of the composition of claim 1, wherein $x$ is more than 0 but less than 1.

7. A process for making the composition of claim 1, comprising:
heating a mixture of elementary phosphorus with at least one member of the group consisting of chromium, $Cr_3P$, $Cr_2P$, $CrP$, $CrP_2$, molybdenum, $Mo_4P_3$, $Mo_3P$ and $MoP$, at a temperature of at least 700° C. and a pressure of at least about 3 kilobars.

8. The process of claim 7 employing a gram atomic ratio of phosphorus/chromium, molybdenum, of 2–4.5/1.

9. The process of claim 7 employing a gram atomic ratio of phosphorus/chromium, molybdenum, of about 4/1.

10. An electrical conductor comprising the composition of claim 1.

References Cited

Chem. Abstracts, vol. 70, 32440e, 1969.

DOUGLAS J. DRUMMOND, Primary Examiner

U.S. Cl. X.R.

23—204